US010680717B2

(12) United States Patent
Razzell

(10) Patent No.: US 10,680,717 B2
(45) Date of Patent: Jun. 9, 2020

(54) SYSTEMS AND METHODS FOR POLARIZATION CONTROL USING BLIND SOURCE SEPARATION

(71) Applicant: Maxim Integrated Products, Inc., San Jose, CA (US)

(72) Inventor: Charles John Razzell, Pleasanton, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 16/379,316

(22) Filed: Apr. 9, 2019

(65) Prior Publication Data

US 2019/0379462 A1  Dec. 12, 2019

Related U.S. Application Data

(60) Provisional application No. 62/682,599, filed on Jun. 8, 2018.

(51) Int. Cl.
*H04B 10/61* (2013.01)
*H04J 14/06* (2006.01)
*H04L 27/26* (2006.01)

(52) U.S. Cl.
CPC ..... *H04B 10/6151* (2013.01); *H04B 10/6166* (2013.01); *H04J 14/06* (2013.01); *H04L 27/2647* (2013.01)

(58) Field of Classification Search
None
See application file for complete search history.

(56) References Cited

U.S. PATENT DOCUMENTS

| 5,247,382 A * | 9/1993 | Suzuki | H04B 10/532 398/161 |
| 6,535,666 B1 * | 3/2003 | Dogan | G01S 3/74 385/12 |
| 6,782,211 B1 * | 8/2004 | Core | H04B 10/60 398/204 |
| 8,406,621 B2 * | 3/2013 | Painchaud | H04B 10/676 398/16 |
| 9,729,362 B1 * | 8/2017 | Ralph | H04J 14/06 |
| 9,768,874 B1 * | 9/2017 | Ralph | H04B 10/0795 |
| 9,794,092 B1 * | 10/2017 | Isautier | H04B 10/6161 |
| 2012/0084619 A1 * | 4/2012 | Kuschnerov | H04J 14/06 714/752 |

(Continued)

*Primary Examiner* — Li Liu
(74) *Attorney, Agent, or Firm* — Michael North; North Weber & Baugh LLP

(57) ABSTRACT

Analog signal processing systems and methods manage polarization in coherent optical receivers to eliminate the need for ultra-fast, power-hungry ADCs and DSPs and that require digitization of the full-bandwidth signal path and result in bulky and expensive circuit designs. Various embodiments an analog polarization correction circuit that implements the equivalent of two matrix operations by combining variable and unity gain amplifiers to align polarizations of input signals to generate a polarization-corrected output signal that is aligned with the polarization frame of reference of a receiver. Various embodiments use BSS to perform polarization control, including electro-optical polarization control, in a feedback loop and operate without the need for a pilot tone or a startup sequence when deducing the polarization state.

20 Claims, 15 Drawing Sheets

(56) References Cited

U.S. PATENT DOCUMENTS

| | | | | |
|---|---|---|---|---|
| 2012/0155883 A1* | 6/2012 | Tanaka | ............... | H04B 10/6161 |
| | | | | 398/115 |
| 2013/0064554 A1* | 3/2013 | Li | ..................... | G02B 6/02009 |
| | | | | 398/143 |
| 2014/0341236 A1* | 11/2014 | Yu | .......................... | H04J 14/06 |
| | | | | 370/499 |

* cited by examiner

1000

1100

1200

1300

1400

1500

SYSTEMS AND METHODS FOR POLARIZATION CONTROL USING BLIND SOURCE SEPARATION

CROSS-REFERENCE TO RELATED APPLICATION

This patent application is related to and claims priority benefit under 35 U.S.C. § 119(e) to commonly-owned U.S. Provisional Patent Application No. 62/682,599, entitled "Systems and Methods for Polarization Control Using Blind Source Separation," naming as inventor Charles John Razzell, and filed Jun. 8, 2018, which patent document is incorporated by reference herein in its entirety and for all purposes.

TECHNICAL FIELD

The present disclosure relates generally to electrical signal processing. More particularly, the present disclosure related to systems and methods for controlling and recovering polarization and carrier phase in electro-optical communication systems.

BACKGROUND

Coherent optical communication links at rates of 100 Gbps/λ and higher have been commercially deployed in recent years. These systems heavily rely on power-hungry (e.g., >10 W) digital signal processing (DSP) devices even for cutting-edge CMOS process technologies (e.g., 16 nm linewidths in commercial products). The ability to support unamplified links of up to 80 km at such high rates justifies the cost of powerful DSPs in light of a reduction of other capital expenses and operating costs. On the other hand, the ever-increasing demand for high bandwidth communications within data centers is pushing direct-detection, intensity modulation four-level pulse amplitude modulation (PAM4) schemes to their limits.

For example, IEEE P802.3cd is expected to standardize as one of its PHY options, 100 GBASE-DR, 100 Gb/s serial transmission over one wavelength using PAM4 over of single-mode fiber >500 m. Results from contributors to the IEEE P802.3cd task group, shown in FIG. 1 (IEEE SMF Task Group Contribution by Marco Mazzini (Cisco), August 2014), indicate that 56 Gbaud/112 Gbps PAM4 requires a feed-forward equalizer to open the eye. Although some approaches have demonstrated feasibility, numerous contributions indicate that meeting link budget margins for this type of PHY option remains challenging.

One type of distortion that a polarized optical input beam that passes through an optical fiber plant experiences relates to undesirable changes to the state of polarization (SOP) of the signal that occur during transmission. In order to avoid having to manipulate polarization states in the DSP domain, which would normally be the expectation for a DSP-based coherent receiver, some designers have proposed to implement polarization control by using optical modulators. To facilitate this, a pilot or marker tone is added at the transmitter to label and track one of the phases of the two polarizations (e.g., the x-polarization, in-phase signal branch) as a reference, such that a control loop algorithm running in a low-power CPU can monitor and adjust the polarization states to correct for polarization rotations in two or three degrees of freedom.

The pilot tone (e.g., 50 kHz) that has been superimposed onto the XI tributary at the transmitter is used to recover the state of polarization at the receiver that low-pass filters the XQ, YI, and YQ signals and synchronously detects these signals in the four branches. Thus, the receiver monitors the amplitudes and signs of these signals, while assuming that carrier phase lock has already been achieved. Low speed signal processing can then be used to adjust the polarization angles to reduce the unwanted pilot tone amplitudes, such that the receiver can compensate for polarization rotation in the fiber. However, this approach suffers from drawbacks related to a bootstrap problem, namely that (1) marker tone detection is possible only after carrier phase recovery, and (2) the carrier recovery depends on the polarization states having first been corrected, e.g., to ensure that a QPSK constellation is available for detection.

One proposed solution to alleviate these drawbacks involves a transmit startup protocol, wherein the same data is simultaneously transmitted in each of the two polarization branches. This requirement allows the carrier recovery loop to "see" QPSK modulation regardless of polarization state, such that carrier phase lock can be achieved. In a second step, the polarization recovery loop is enabled, with the expectation that the 50 kHz marker tone will now be found at the expected frequency. However, such a solution is less than ideal because (1) special startup sequences may not be feasible in a system context due to compatibility reasons (e.g., lack of suitable protocols that can facilitate a special startup sequence), and (2) if DQPSK is used, no phase-locked system is present, such that the ability to synchronously detect the pilot tone, which hinges on a phase-locked system, is lost. As a result, each time lock is lost for any reason, the link has to be broken and restarted causing undesirable disruptions to the operation.

Accordingly, what is needed are systems and methods that operate pilot-less and startup sequence-free when deducing the polarization state.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE EMBODIMENTS

Figure 1:
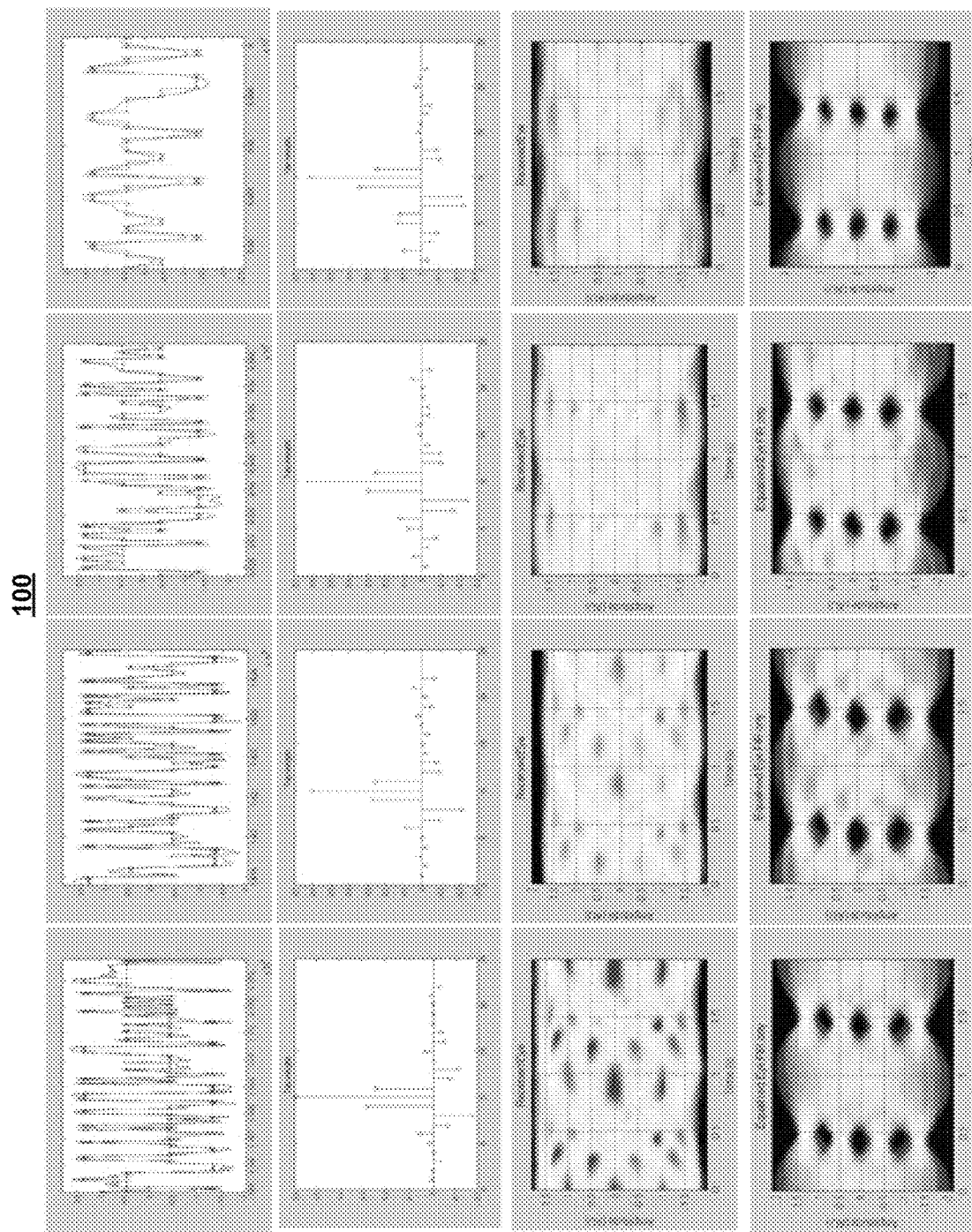
FIG. 1 illustrates the limitations of PAM4 modulation schemes proposed in the prior art that require a feed-forward equalizer.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

It is noted that: (1) certain steps may optionally be performed; (2) steps may not be limited to the specific order set forth herein; (3) certain steps may be performed in different orders; and (4) certain steps may be done concurrently. For example, while examples are given in the context of blind source separation (BSS) methods applied to optical receivers, one skilled in the art will recognize that the teachings of the present disclosure are not limited to the BSS applications described herein and may equally be applied individually, jointly, or simultaneously, in any combination and in other contexts, e.g., in applications that may or may not involve carrier phase recovery.

Various embodiments advantageously use low-rate (e.g., sample rates in the order of 10 MHz) digital samples of the XI, XQ, YI, and YQ and estimate the unknown, complex Jones 2×2 matrix, which describes the polarization transformation in the fiber plant, from the samples of XI, XQ, YI and YQ without prior information. In embodiments, the complex Jones matrix is estimated by treating it as a mixing matrix and applying to the resulting signal vectors a suitable BSS method, such as for example, (1) Joint Approximate Diagonalization of Eigen-matrices (JADE); (2) Fast Fixed-Point Algorithm for Independent Component Analysis of Complex Valued Signals (cFAST-ICA); and (3) Efficient Variant of Algorithm FastICA for Independent Component Analysis (EFICA). In short, once the problem is framed as a BSS problem, it may then be solved by selecting and using an appropriate method for solving the resulting BSS problem by using a BSS method that operates on complex matrices to separate out the polarizations at the receiver without having to resort to pilot tones, startup sequences, or any other suboptimal techniques.

Since these methods rely only on the statistical properties of data sets, e.g., to optimize separation into independent components, advantageously, estimating the Jones matrix using BSS is not bound to Nyquist sampling according to the Baud rate of the communications signal to obtain satisfactory results. In fact, in embodiments, massive undersampling (e.g., by several orders of magnitude), which is limited only by the update rate for the SOP changes in the fiber plant, may be employed. In addition, undersampling advantageously reduces computational complexity and power consumption for computing, e.g., updates to a receiver's polarization control state variables (e.g., $\phi$ and $\theta$).

In embodiments, a sample rate much lower than the signal bandwidth Nyquist rate may be used, while sample-and-hold and ADC circuits (e.g., in the front-end) are configured to operate without applying excessive low pass filtering that, otherwise, may cause the statistics to shift towards Gaussian statistics, for example, due to the Central Limit Theorem. Therefore, in embodiments, a high bandwidth sample-and-hold circuit is paired with a modest sample rate ADC to acquire data, thus, avoiding the use of expensive ultra-high, multi-bit speed ADCs in the signal path.

Figure 2:
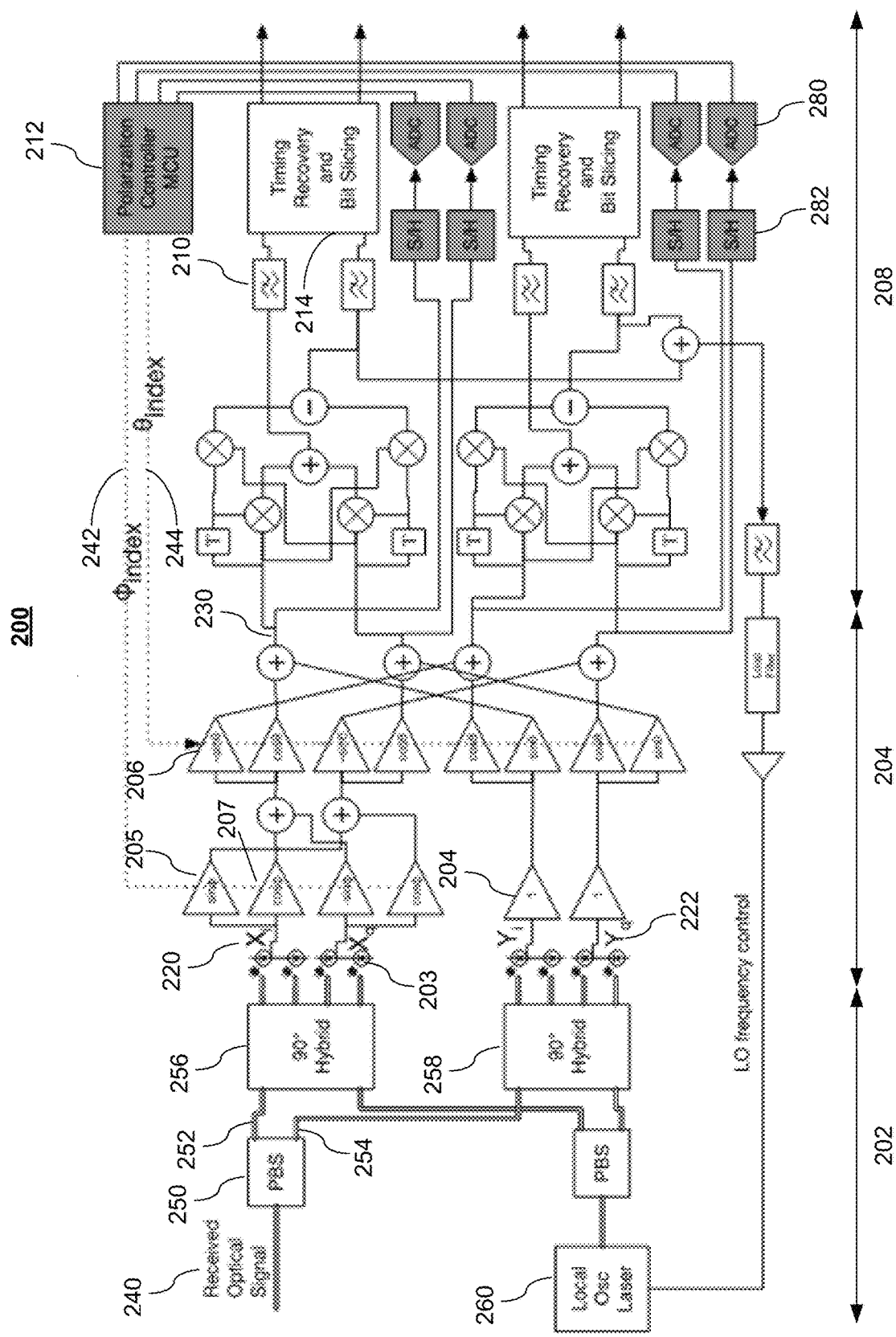
FIG. 2 illustrates an exemplary block diagram of a receiver architecture that senses polarization via digital subsampling, according various embodiments of the present disclosure.

FIG. 2 illustrates an exemplary block diagram of a receiver architecture that senses polarization via digital subsampling, according various embodiments of the present disclosure. In FIG. 2, receiver 200 is depicted as a dual polarization M-QAM receiver; however, this is not intended as a limitation on the scope of the disclosure, of course. Receiver circuit 200 is an optical receiver that may comprise optical front-end 202, and analog polarization correction circuit 204, differential modulator circuit 208.

In embodiments, optical front-end 202, comprises photo-diodes 203, PBS 250, 90o-hybrid 256, and local oscillator 260. Optical front-end 202 may be any optical front-end known in the art. In embodiments, analog polarization correction circuit 204 may comprise amplifiers 205-207 and processes the output of photo-diodes 203 to isolate two polarization streams prior to differential detection by differential modulator circuit 208. Differential modulator circuit 208 may comprise low-pass filters 210, ADCs 280, memory buffers (e.g., RAM), sample-and-hold circuits 282, timing recovery and bit slicing modules 214, 216, and polarization controller 212 (e.g., a microcontroller) that may output angles 242 and 244 and performs a non-linear operation that involves squaring of amplitudes.

In embodiments, input signal 240 is comprised of independent bit streams in the X-polarization and the Y-polarization that are separated from each other in receiver 200 in order to access the independent bit streams. In embodiments, this is accomplished by undoing arbitrary, unknown rotations in at least two degrees of freedom that input signal 240 may undergo in fiber channel and that may otherwise affect each other.

In detail, optical front-end 202 receives, e.g., via PBS 250, input signal 240, e.g., from an optical channel. PBS 250 separates input signal 240 into two components, X and Y, that are orthogonal polarizations in two branches, i.e., an X-polarization branch 252 and a Y-branch 254. In embodiments, X-polarization branch 252 is input to 90o-hybrid 256, e.g., a six-port hybrid, and Y-polarization 254 branch is input to 90o-hybrid 256.

In embodiments, hybrid 256, 258 may comprise a connection for local oscillator 260, such as a laser. It is noted that in an ideal homodyne receiver, local oscillator 260 operates on the same wavelength as the to-be-decoded signal. In practice, drift and tolerances may result in less than ideal conditions, such that wavelengths are not exactly the same.

In embodiments, hybrid 256 creates different phases based on the summation of its input signals. In embodiments, in the top branch that comprises hybrid 256, the local oscillator signal is summed with the X-polarization signal 252, and hybrid 256 outputs four phases, e.g., 0o, 180o, 90o, and 270o. Conversely, Y-polarization is processed in the bottom branch by hybrid 258 to output, e.g., four signals having four phases and in the same order as hybrid 254.

Photo-diodes 203 may be differential photo-diodes that, in embodiments, process light, which has positive amplitude, i.e., photo-diodes 203 themselves do not generate negative signals. In embodiments, the outputs of adjacent photo-diodes 203 are electrical current signals that are 180o out-of-phase and that represent the difference of, e.g., the 0o output of hybrid 256 and the 180o output, i.e., a bipolar photo current that may assume both positive or negative values. The difference in the photo currents is a signal that represents the in-phase component Xi, of X-polarization signal 252. Similarly, photo-diodes 203 on the 90o output and the 270o output generate a bipolar photo current that represents quadrature component, Xq, of the X-polarization signal 252, and so on. Overall, hybrids 256, 258 may each output two electrical signals in balanced pairs, e.g., Xi and Xq that refer to in-phase polarization and quadrature polarization, respectively. It is understood that these four electrical signals may be amplified, filtered, and further processed throughout the rest of receiver 200.

In embodiments, in-phase signal, Xi, and quadrature signal, Xq, are input to analog polarization correction circuit 204 that rotates the phases of the signals in the X-polarization branch relative to the phase of the y-polarization signal. In embodiments, an emphasis on the relative value of the phase difference allows to rotate the X-polarization values while not rotating the Y-polarization values. As illustrated in FIG. 2, this may be accomplished by employing the four amplifiers (e.g., 202) in the X-polarization branch to rotate the phase angles $\phi$ of the input signals of the amplifiers, while not rotating the phase angles of the input signals of amplifiers (e.g., 204) in the Y-polarization branch that may have unity gain.

The rotated signals may then be processed, e.g., by the set of eight amplifiers 206 that, in embodiments, act as $\theta$-rotators that rotate the combination of the in-phase and quadrature signals such as to align them with the X- and Y-coordinates of receiver 200 in a manner that they become separated. As a result, the output of the $\theta$-rotators is polarization-corrected, thus, providing for a clean separation of the polarization signals. One skilled in the art will appreciate that, in embodiments, a negative sign may be moved into the function of an amplifier itself, for example by commutating differential signal pairs.

In embodiments, the separated polarization signals are provided to differential modulator circuit 208, e.g., to find the phase rotations. The phase angles $\theta$ of the output of analog polarization correction circuit 204 represent phase differences that may be processed using conventional bit-slicing and timing recovery to obtain the actual bit stream.

In embodiments, polarization controller may be used to output two phase angles $\phi$ and $\theta$ that, in turn, may control the specific weights of the gains of the two sets of amplifiers to efficiently undo the polarization rotation in the fiber channel, such that the output of those summation blocks in analog polarization correction circuit 204 are corrected for polarization and are the same signal as was originally transmitted independently in two channels. In other words, the blocks of amplifiers may be controlled in a feedback loop by phase angles $\phi$ and $\theta$ to successfully accomplish that task and resolve the two polarizations, i.e., the X- and Y-polarization branches of the receiver, separately to obtain orthogonal signals in the two branches prior to processing them using differential detection, etc., in a subsequent block of mixers.

In embodiments, polarization controller 212 may be implemented as a modest complexity hardware component, such as an ARM core, by taking advantage of the sub-sampling of data received in four memory buffers (not shown) to reduce signal processing computation rates to manageable levels. In embodiments, polarization controller 212, ADCs 280, and sample-and-hold circuits 282 in FIG. 2 are configured to facilitate data collection by memory buffers that accumulate sufficient statistics that allows controller 212 to run a BSS method, such as JADE, FAST-ICA, or EFICA, e.g., to manipulate a demixing matrix such as to obtain angles 242, 244 that then may be derived and used for estimating polarization states in a continuous feedback loop. In embodiments, signals in the four branches of receiver 200 may be sampled after they have been corrected for polarization, but before a non-linear processing step that may be used for differential demodulation that demixes the polarization.

In embodiments, ADCs 280 may be implemented as low complexity ADCs that use a relatively low sample rate, e.g., in the order of a few MHz, which may be sufficient to keep up with the rate of change/rotation of polarization in the fiber plant based on the Nyquist rate for the highest frequency for the polarization/phase rotation, present no impediment to BSS. In embodiments, the bandwidths of sample-and-hold circuits 282 are chosen to be compatible with the sampled signals.

Figure 3:
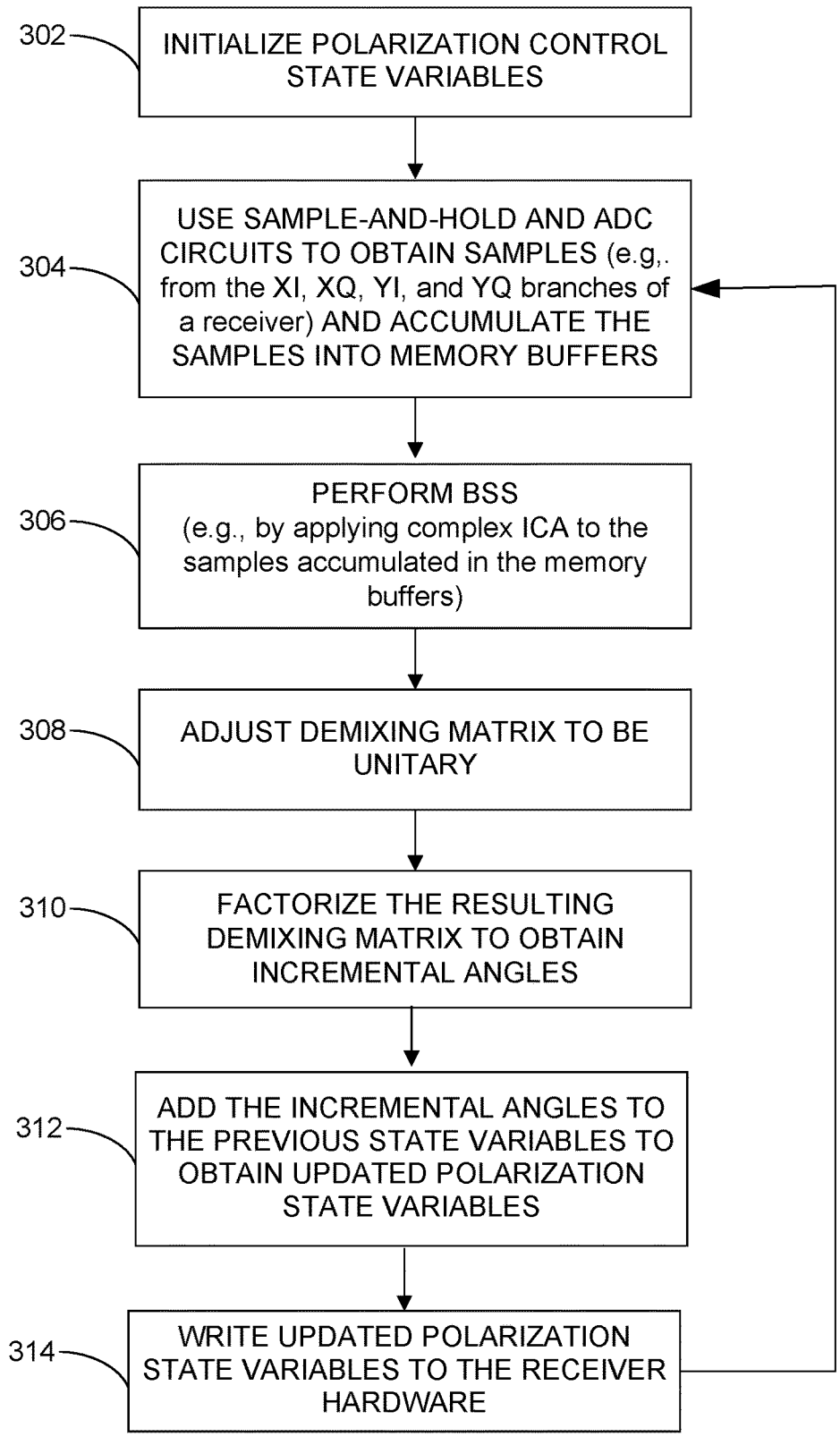
FIG. 3 is a flowchart for applying polarization control based on blind source estimation, according various embodiments of the present disclosure.

FIG. 3 is a flowchart for applying polarization control based on blind source estimation, according various embodiments of the present disclosure. In embodiments, the method may be implemented, e.g., by a receiver having an architecture similar to that shown in FIG. 2. Process 300 in FIG. 3 may begin at step 302, when polarization control state variables are initialized, e.g., such that $\theta_0=0$ and $\phi_0=0$.

At step 304, using a set of sample-and-hold and ADC circuits in a receiver, obtain a number of samples from the XI, XQ, YI, and YQ branches of the receiver and accumulate the samples into a set of memory buffers. One skilled in the art will appreciate that samples may be acquired concurrently.

At step 306, BSS may be performed, e.g., by applying Complex ICA to the samples in the memory buffers accumulated at step 304.

At step 308, the demixing matrix (e.g., 2×2) may be adjusted to become unitary. In embodiments, this may be accomplished using any of the methods described below.

At step 310, the resulting demixing matrix may be factorized to obtain incremental angles, e.g., $\Delta\phi$ and $\Delta\theta$.

At step 312, the incremental angles may be added to the previous state variables $\theta_{k+1}=\theta_k+\Delta\theta$ and $\phi_{k+1}=\phi_k+\Delta\phi$ to obtain updated polarization state variables $\{\theta_{k+1}, \phi_{k+1}\}$.

At step 314, the updated polarization state variables $\{\theta_{k+1}, \phi_{k+1}\}$ may be written to the receiver hardware; process 300 may resume with step 304.

In embodiments, in addition to polarization control applications, the systems and methods described herein may be extended to carrier phase estimation or recovery applications, e.g., for coherent modulation schemes, as described in the following paragraphs.

1. Simultaneous, Joint Recovery of Polarization and Carrier Phase

In embodiments, the complex Jones matrix may be factorized into individual rotations according to four degrees of freedom. Thus, the inverse of the Jones matrix, i.e., demixing matrix $J^{-1}$, may be expressed as:

$$J^{-1} = e^{\frac{j\psi}{2}} \begin{bmatrix} e^{-\frac{j\phi_0}{2}} & 0 \\ 0 & e^{\frac{j\phi_0}{2}} \end{bmatrix} \begin{bmatrix} \cos\theta & -\sin\theta \\ \sin\theta & \cos\theta \end{bmatrix} \begin{bmatrix} e^{-\frac{j\phi_1}{2}} & 0 \\ 0 & e^{\frac{j\phi_1}{2}} \end{bmatrix}. \quad \text{(Eq. 1)}$$

In embodiments, instead of resolving the values of $\phi_0$ and $\psi$, which represent the absolute carrier phases in the X- and Y-polarization branches, by using means such as Differential Demodulation or an analog Costas loop, the complete demixing matrix $J^{-1}$ may be obtained by using BSS to also perform carrier phase recovery, i.e., in addition recovering in-phase and quadrature components for the X- and Y-polarization modes.

Figure 4:
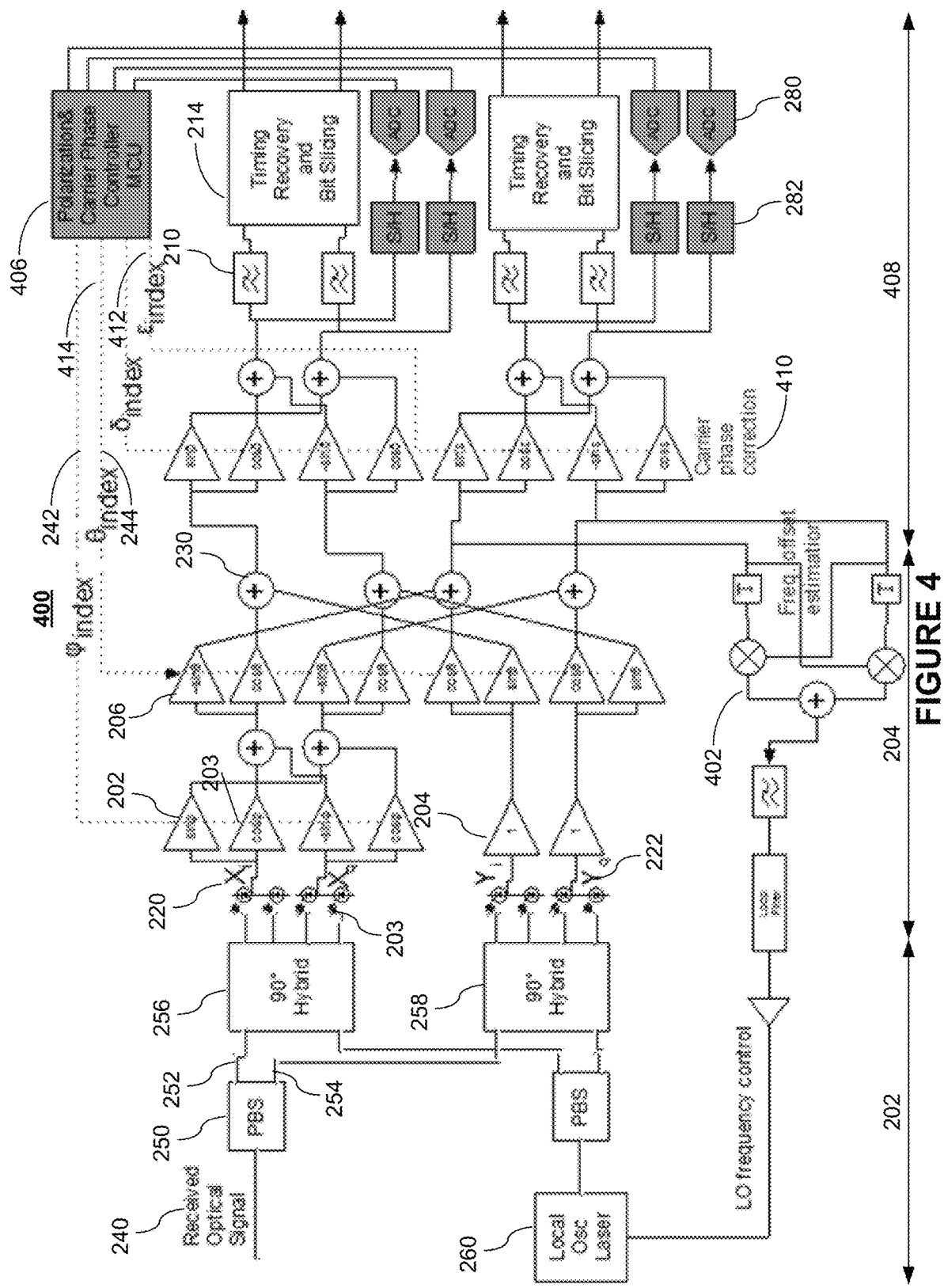
FIG. 4 illustrates an exemplary block diagram of a receiver architecture that uses electronic feedback control to perform carrier phase correction, according various embodiments of the present disclosure.

FIG. 4 illustrates an exemplary block diagram of a receiver architecture that uses electronic feedback control to perform carrier phase correction, according various embodiments of the present disclosure. As depicted in FIG. 4, receiver 400 is a dual polarization M-QAM receiver. However, this is not intended as a limitation. For purposes of brevity, a description of similar components previously described with respect to FIG. 2 and their function is not repeated here.

Receiver 400 comprises carrier phase correction 410 that injects carrier phase information into receiver 400. FIG. 4 is an exemplary implementation that illustrates where absolute carrier phase control may be applied in the analog domain according to updates that have been computed using BSS computed in a suitable microcontroller. For convenience, $\phi_0$ and $\psi$ have been reformulated as phase angles $\delta$ and $\epsilon$ in the diagram.

In theory, preventing the mixing of I and Q components is expected to work well for square or rectangular signal constellations, such as 4-QAM, 16-QAM, but less well for circular constellations, such as 8-PSK, or higher, because in order for the carrier phase estimates to be adequately estimated, the degree of independence of the information resolved into the receiver's in-phase and quadrature channels should be a strong function of the rotation of the signal constellation.

Figure 5:
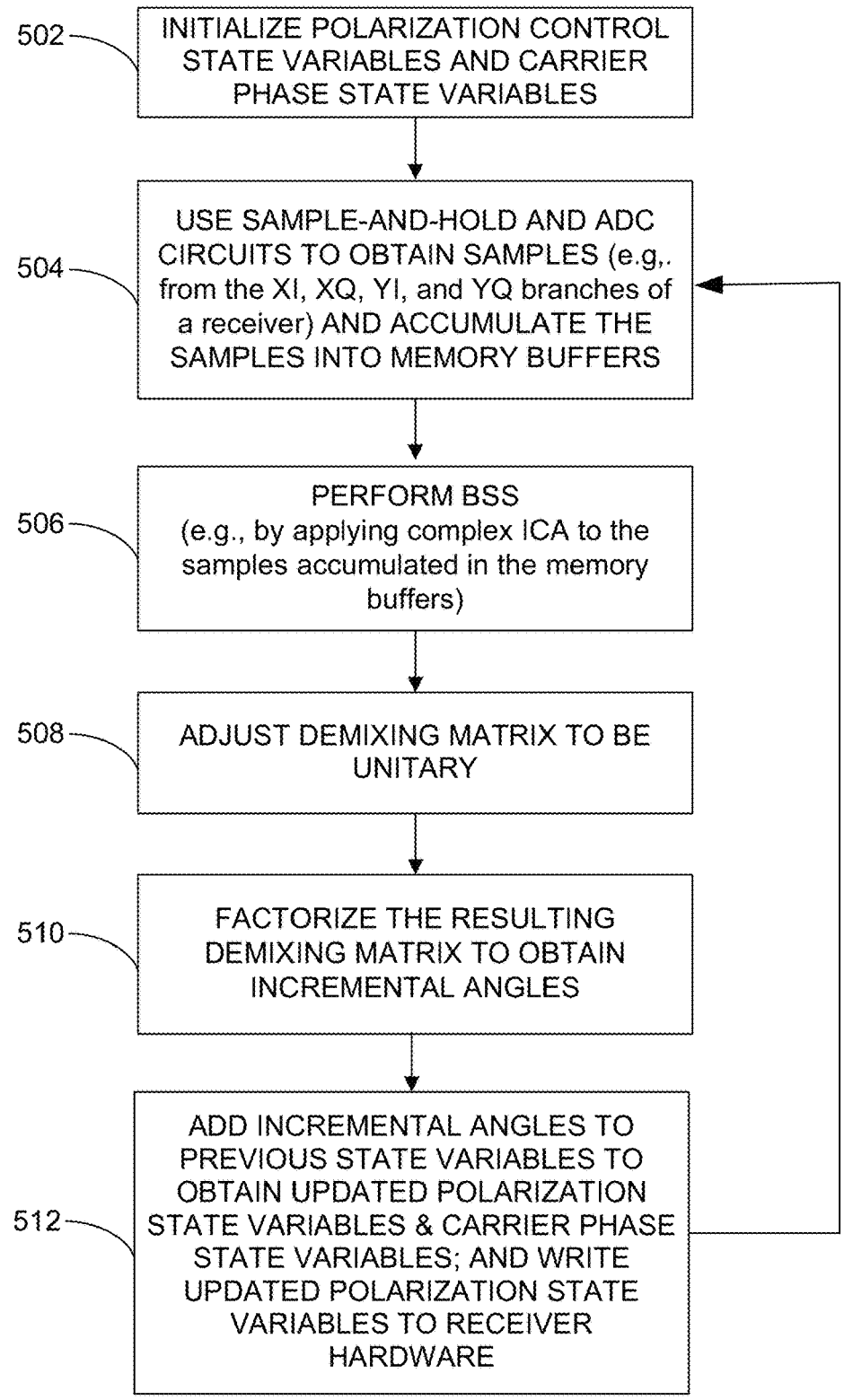
FIG. 5 is a flowchart for applying polarization and carrier phase control based on blind source estimation, according various embodiments of the present disclosure.

FIG. 5 is a flowchart for applying polarization and carrier phase control based on blind source estimation, according various embodiments of the present disclosure. In embodiments, the method may be implemented, e.g., by a receiver having an architecture similar to that shown in FIG. 4. Process 500 may begin, at step 502, when polarization control state variables and carrier phase state variables are initialized, e.g., such that $\theta_0=0$, $\phi_0=0$ and $\delta_0=0$, $\epsilon_0=0$.

At step 504, using a set of sample-and-hold and ADC circuits in a receiver, obtain a number of samples from the XI, XQ, YI, and YQ branches of the receiver and accumulate the samples into a set of memory buffers. One skilled in the art will appreciate that samples should be acquired concurrently.

At step 506, BSS may be performed, e.g., by applying Complex ICA to the samples in the memory buffers accumulated at step 504.

At step 508, the demixing matrix (e.g., 2×2) may be adjusted to become unitary. In embodiments, this may be accomplished using any of the methods described below.

At step 510, the resulting demixing matrix may be factorized to obtain incremental angles, e.g., $\Delta\phi$, $\Delta\theta$, $\Delta\delta$ and $\Delta\epsilon$.

At step 512, the incremental angles may be added to the previous state variables $\theta_{k+1}=\theta_k+\Delta\theta$, $\phi_{k+1}=\phi_k+\Delta\phi$, $\delta_{k+1}=\delta_k+\Delta\delta$ and $\epsilon_{k+1}=\epsilon_k+\Delta\epsilon$ to obtain updated polarization state variables $\{\theta_{k+1}, \phi_{k+1}\}$ and carrier phase state variables $\{\delta_{k+1}, \epsilon_{k+1}\}$ that may be written to the receiver hardware; and process 500 may resume with step 504.

2. Use of Complex or Real Versions of ICA

In embodiments, instead of treating the mixing matrix as being equivalent to a 2×2 complex Jones matrix, J, and using complex versions the ICA algorithms to estimate J, the two complex data streams output by the (four) branches of the receiver may be treated as four real data streams that produce signals that may unmixed using, e.g., a 4×4 real matrix instead of a 2×2 complex matrix. Therefore, in embodiments, each output may be viewed as the product of four unknown mixing coefficients and respective four input signals.

$$\begin{bmatrix} E_{rxi} \\ E_{rxq} \\ E_{ryi} \\ E_{ryq} \end{bmatrix} = \quad \text{(Eq. 2)}$$

$$\begin{bmatrix} \Re\{J_{11}\} & -\Im\{J_{11}\} & \Re\{J_{12}\} & -\Im\{J_{12}\} \\ \Im\{J_{11}\} & \Re\{J_{11}\} & \Im\{J_{12}\} & \Re\{J_{12}\} \\ \Re\{J_{21}\} & -\Im\{J_{21}\} & \Re\{J_{22}\} & -\Im\{J_{22}\} \\ \Im\{J_{21}\} & \Re\{J_{21}\} & \Im\{J_{22}\} & \Re\{J_{22}\} \end{bmatrix} \begin{bmatrix} E_{txi} \\ E_{txq} \\ E_{tyi} \\ E_{tyq} \end{bmatrix}$$

By writing J as a real matrix in this manner, the real and imaginary parts of each of the four elements of J are used twice. However, if a real ICA algorithm is used to estimate the 16-element mixing matrix, there would be 16 degrees of freedom in the estimate, and the pairs of coefficients that should be numerically equal to each other may be only approximately equal, e.g., due to additional noise. Therefore, in embodiments, when interpreting a matrix, such as the above 4×4 matrix, as a Jones matrix that has less, here four, degrees of freedom, two averaging steps may be performed to obtain the benefits of averaging. The first step may yield, e.g., a complex 2×2 matrix based on the 16 values in the 4×4 matrix; and the second step may yield a complex unitary matrix based on the complex, e.g., 2×2 matrix.

In embodiments, the first step may provide an estimate of J as given by expression $$\hat{J} = \frac{1}{2} \begin{bmatrix} (M_{11} + M_{22}) + j(M_{21} - M_{12}) & (M_{13} + M_{24}) + j\left(\begin{array}{c} M_{23} - \\ M_{14} \end{array}\right) \\ (M_{31} + M_{42}) + j(M_{41} - M_{32}) & (M_{33} + M_{44}) + j\left(\begin{array}{c} M_{43} - \\ M_{34} \end{array}\right) \end{bmatrix}. \quad \text{(Eq. 3)}$$

However, this expression may be valid only if the 4×4 mixing matrix has not permuted the imaginary part of the Y-polarization with the imaginary part of the X-polarization or the real part of the Y-polarization with the imaginary part of the X-polarization.

In other words, rows 1 and 2 should belong to the same complex number before undertaking this kind of averaging. In embodiments, at most, one pair of rows may need to be swapped to meet this criterion. The row that "belongs" with row 1 can be found by using a permuted, and selectively negated version of the first row as a predicted value for the second row and finding the closest match amongst the candidate rows 2, 3 and 4.

In embodiments, the second step involves forcing this matrix to be unitary. If $\hat{J}$ is invertible, then the closest unitary matrix to $\hat{J}$ is $$\hat{J}_u = (\hat{J} \cdot \hat{J}')^{-1/2} \hat{J} \quad \text{(Eq. 4)}$$

where the prime superscript indicates conjugate transpose and $(\cdot)^{-1/2}$ indicates the inverse of the matrix square root.

In embodiments, the expression for $\hat{J}_u$ results in a unitary matrix that, advantageously, reduces the number of degrees of freedom down to, here, four, which aids in noise reduction.

It is noted that although the fiber plant polarization rotation can be expressed as a unitary matrix, certain implementation impairments in the optical front end may not be unitary. For example, finite extinction ratios in a polarization beam splitter or polarization dependent losses may lead to a non-unitary transfer matrix. Depending on the magnitude of these impairments, forcing the demixing matrix to be unitary may make the estimation worse than if this step were omitted. Hence this step, should be applied in systems where the unitary approximation holds within an acceptable error tolerance.

Figure 6:
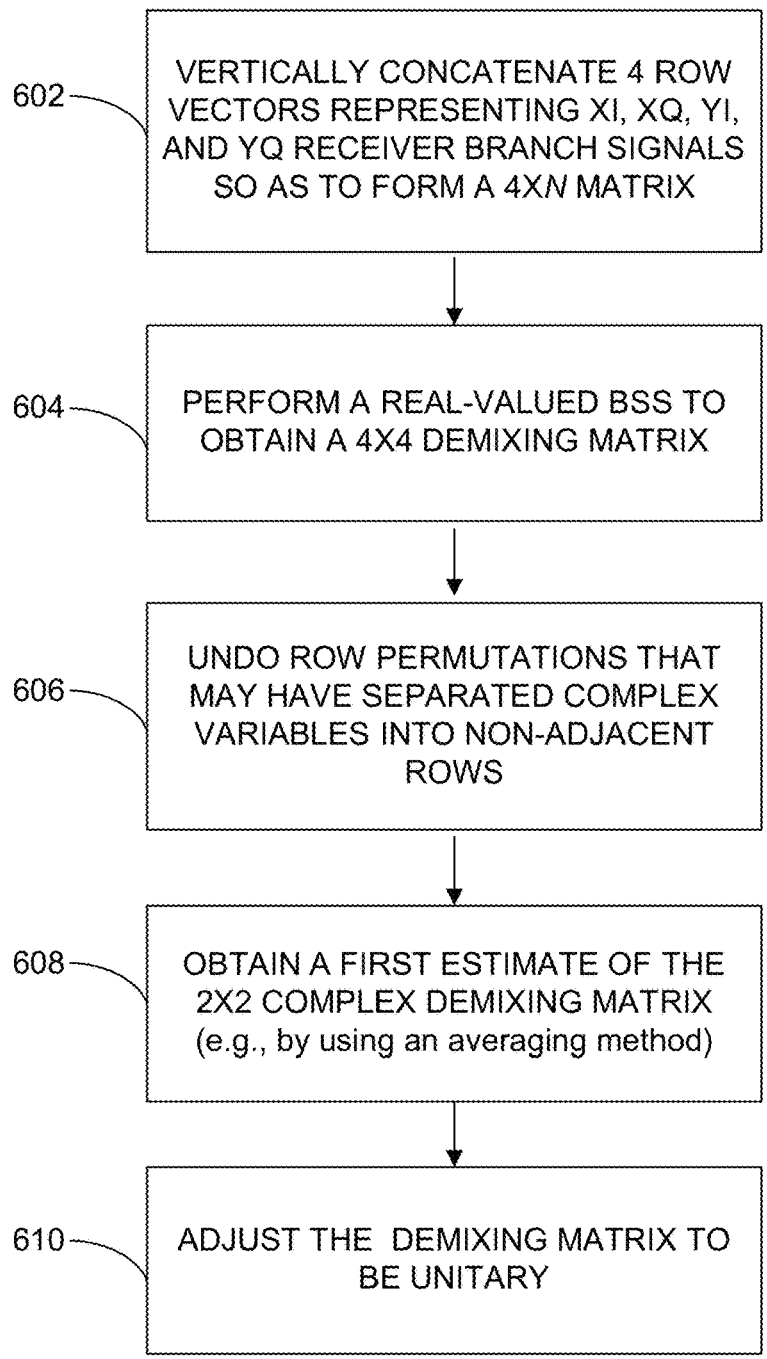
FIG. 6 is a flowchart for coherent combining of two receiver branches with initially unknown relative phase, according various embodiments of the present disclosure.

FIG. 6 is a flowchart for coherent combining of two receiver branches with initially unknown relative phase, according various embodiments of the present disclosure. In embodiments, the method may be implemented, e.g., by a receiver having an architecture similar to that shown in FIG. 4. Process 600 may begin, at step 602, when four row vectors that represent XI, XQ, YI, and YQ receiver branch signals are vertically concatenated such as to form a 4×N matrix.

At step 604, a real-valued BSS is performed to obtain a 4×4 demixing matrix.

At step 606, any row permutations that may have separated complex variables into non-adjacent rows (e.g., using the correlation coefficient as a comparison metric after permuting and inverting the appropriate columns) is undone.

At step 608, a first estimate of the 2×2 complex demixing matrix is obtained, e.g., by using the following averaging method:

$$\hat{J} = \frac{1}{2} \begin{bmatrix} (M_{11} + M_{22}) + j(M_{21} - M_{12}) & (M_{13} + M_{24}) + j\left(\begin{array}{c} M_{23} - \\ M_{14} \end{array}\right) \\ (M_{31} + M_{42}) + j(M_{41} - M_{32}) & (M_{33} + M_{44}) + j\left(\begin{array}{c} M_{43} - \\ M_{34} \end{array}\right) \end{bmatrix}. \quad \text{(Eq. 5)}$$

At step 610, a method may be applied to force $\hat{J}$ to be unitary, e.g., using $$\hat{J}_u = (\hat{J} \cdot \hat{J}')^{-1/2} \hat{J}. \quad \text{(Eq. 6)}$$

which uniquely determines the closest unitary matrix to $\hat{J}$, thereby improving the quality of the estimate in cases where the impairments in the fiber plant and receiver do not significantly deviate from unitary ones.

3. Application of Real FICA to Carrier Phase Estimation Recovery for Polarization Diversity Combining As mentioned previously, in embodiments, different information may be sent in two orthogonal polarization modes of a fiber, and BSS separation may be used to determine a mixing matrix for the four branches of a receiver, e.g., by considering them as four real or two complex signal streams.

In embodiments, when the same information is encoded on two orthogonal polarizations, coherent combining of the orthogonal polarization branches of the receiver may be used to implement polarization diversity. In such instances, the only rotations that may need to be recovered to enable successful polarization diversity combining are the carrier phases. Assuming that the I and Q channels of the receiver comprise independent information, in embodiments, ICA may be used on each pair of I and Q channels to estimate rotations that render the real and imaginary components substantially or entirely independent. In embodiments, such methods of carrier recovery may be preferable to other decision-directed methods for carrier recovery of 16-QAM or higher order modulations that generally work effectively only when the majority of tentative decisions are correct.

Figure 7:
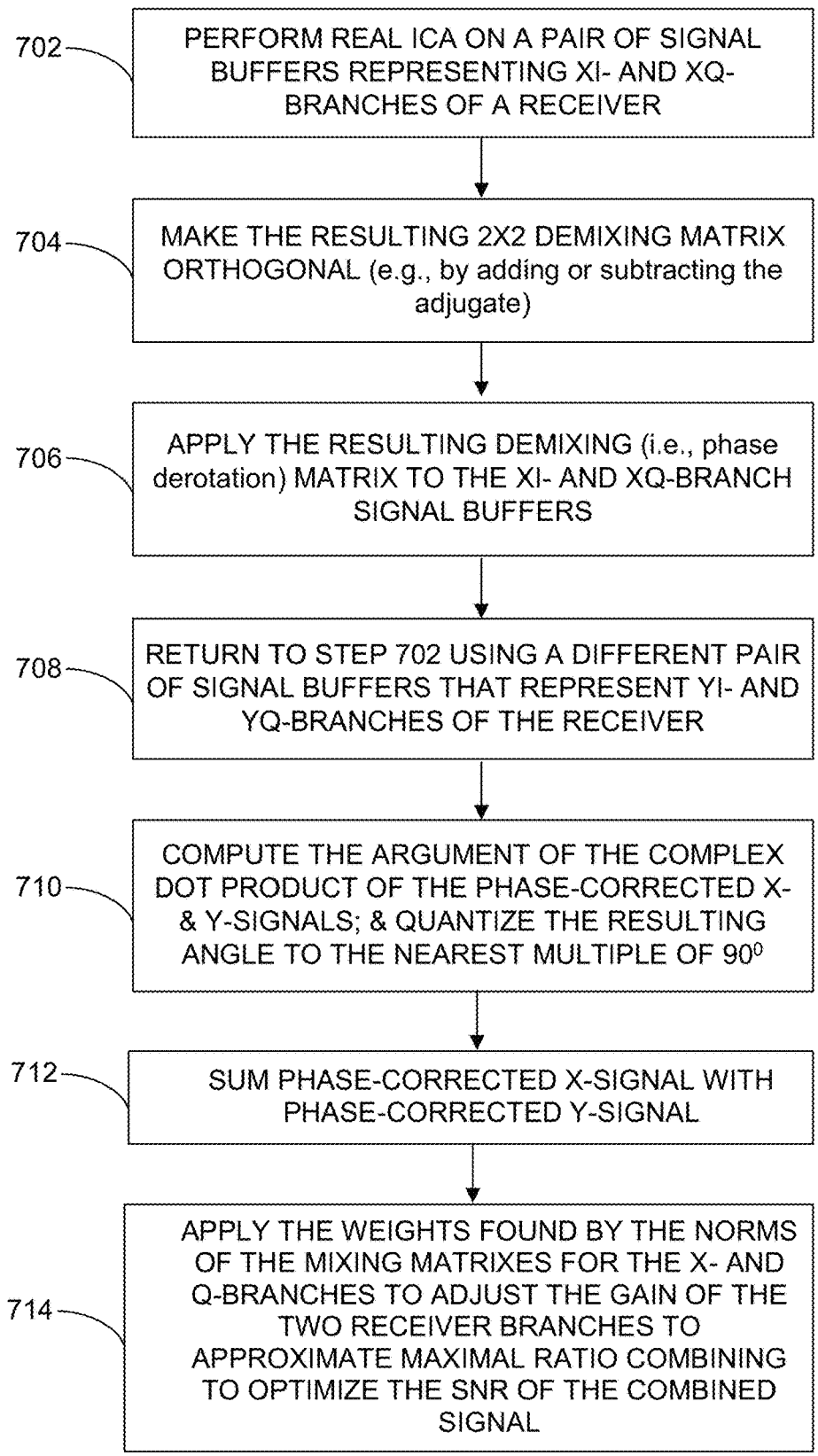
FIG. 7 is a flowchart for coherent combining of two receiver branches with initially unknown relative phase to implement polarization diversity, according various embodiments of the present disclosure.

FIG. 7 is a flowchart for coherent combining of two receiver branches with initially unknown relative phase to implement polarization diversity, according various embodiments of the present disclosure. In embodiments, polarization diversity may be implemented, e.g., by a receiver having an architecture similar to that shown in FIG. 4.

Process 700 may begin, at step 702, when real ICA is performed on a pair of signal buffers representing XI- and XQ-branches of a receiver.

At step 704, a resulting 2×2 demixing matrix may be made orthogonal, e.g., by adding or subtracting the adjugate, e.g. according to the sign of the real part of its determinant.

At step 706, the resulting demixing (i.e., phase derotation) matrix may be applied to the XI- and XQ-branch signal buffers, e.g., by matrix multiplying the 2×2 demixing matrix with a 2×N matrix that comprises XI- and XQ-signal buffers as respective matrix rows.

At step 708, process 700 may return to step 702 using a different pair of signal buffers that represent YI- and YQ-branches of the receiver. At this point, the two X- and Y-branches may have been corrected for carrier phase, subject to a 90-degree relative phase ambiguity.

At step 710, the argument of the complex dot product of the phase-corrected X- and Y-signals may be computed; and the resulting angle may be quantized to the nearest multiple of 90 degrees, e.g., to resolve the remaining 90-degree phase ambiguity.

At step 712, the 0, 90, 180, or 270-degree rotation computed in step 712 may be applied to the Y-polarization signal buffer to bring it into phase alignment with the X-polarization signal buffer.

At step 714, the phase-corrected X-signal (computed at step 706) may be summed with phase-corrected Y-signal (computed at step 712).

At step 716, the weights found by the norms of the mixing matrixes for the X- and Q-branches may be applied to adjust the gain of the two receiver branches so as to approximate Maximal Ratio Combining, thereby optimizing the SNR of the combined signal.

Figure 8:
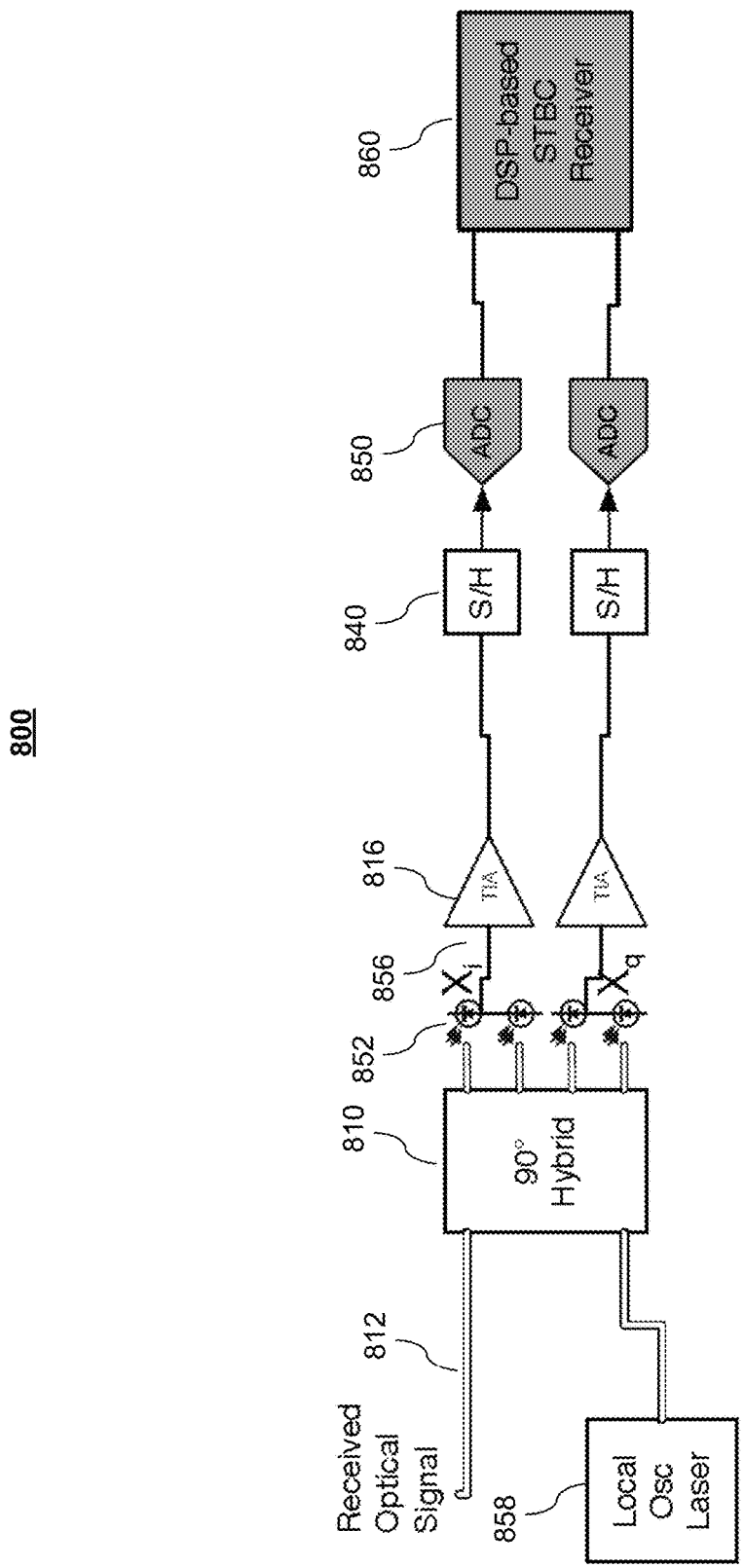
FIG. 8 is an illustrative block diagram of an exemplary optical receiver circuit that implements reception of a transmit polarization diversity scheme organized using a Space-Time Block Coding (STBC) scheme, according various embodiments of the present disclosure.

4. Application of Complex FICA to Blind Channel Estimation for Space Time Block Code (STBC)-Encoded Diversity Transmitters In embodiments, polarization diversity is obtained using an orthogonal block code at the transmitter. This allows the receiver block to be simplified to one branch, thus, making the optical front-end much less onerous to implement. The resulting polarization specificity in the receiver may be compensated by the transmitter's ability to simultaneously transmit in two orthogonal polarizations, while ensuring that signals remain distinct due an orthogonal encoding scheme. FIG. 8 is an illustrative block diagram of an exemplary optical receiver circuit that implements reception of a transmit polarization diversity scheme organized using a Space-Time Block Coding (STBC) scheme, according various embodiments of the present disclosure.

As depicted in FIG. 8, homodyne, digital receiver 800 is a dual polarization DQPSK receiver that comprises a DSP-based STBC transmission polarization diversity M-QAM receiver 860. Receiver 800 comprises a single polarization branch, e.g., the top half of FIG. 8, that, in embodiments, requires a channel estimate that is given by $h_1$ and $h_2$.

In embodiments, a common orthogonal frequency division multiplexing (OFDM) approach may be employed. For simplicity, for a single-carrier approach, pairs of adjacent QAM symbols may be transmitted in a pair of orthogonal polarizations followed by a conjugated and negated conjugate copy of the same pair of symbols transposed. An example of an encoded block may be symbolically expressed as:

$$X: x_1 \quad -x_2^*$$
$$Y: x_2 \quad x_1^*$$
$$\xrightarrow{\text{time}}$$

In embodiments, at the receiver, complex channel tap estimates may be used to express a relationship between the transmitter's X-polarization frame of reference and the receiver's polarization frame of reference ($h_1$); and from the transmitter's Y-polarization frame of reference to the receiver's polarization frame of reference ($h_2$). Coefficients $h_1$ and $h_2$ may be formed into a 2×2 matrix $$H = \begin{bmatrix} h_1 & h_2 \\ -h_2^* & -h_1^* \end{bmatrix}, \quad \text{(Eq. 7)}$$

thus, the original symbols may be recovered using the expression $$\begin{bmatrix} \tilde{x}_1 \\ x_2 \end{bmatrix} = (H^H H)^{-1} H^H \begin{bmatrix} y_1 \\ y_2^* \end{bmatrix}, \quad \text{(Eq. 8)}$$

where $(H^H H)^{-1} H^H$ is known as the pseudo inverse of matrix H.

However, since matrix H is unknown, in embodiments, H is estimated by using BSS techniques, e.g., by forming, in a buffer memory, a 2×N complex matrix of mixed symbols as follows:

$$\begin{bmatrix} y_1 & y_3 & y_5 & y_{2N-1} \\ y_2^* & y_4^* & y_6^* & \cdots & y_{2N}^* \end{bmatrix}. \quad \text{(Eq. 9)}$$

In embodiments, an algorithm, e.g., an ICA algorithm may then be employed that uses the 2×N matrix as input data to find a demixing matrix D, e.g., a 2×2 matrix. In embodiments, the estimation quality of D may be improved by forcing D to be unitary, e.g., by any suitable method previously described.

In embodiments, the demixing matrix D is assumed to be a reasonable approximation of the pseudo inverse of matrix H (i.e., $D \cong (H^H H)^{-1} H^H$), such that D may be substituted for $(H^H H)^{-1} H^H$ to estimate the separated symbols in their original state, e.g., according to the expression $$\begin{bmatrix} x_1 & x_3 & \tilde{x}_5 & x_{2N-1} \\ x_2 & x_4 & x_6 & \cdots & x_{2N} \end{bmatrix} = D \begin{bmatrix} y_1 & y_3 & y_5 & y_{2N-1} \\ y_2^* & y_4^* & y_6^* & \cdots & y_{2N}^* \end{bmatrix}. \quad \text{(Eq. 10)}$$

In embodiments, since the resulting symbols may be subject to a rotational uncertainty of an integer multiple of 90 degrees (i.e., 90, 180, 270), such uncertainty may be resolved using any method known in the art, such as continuous pilot tones or a preamble, that may provide an appropriate external reference, e.g., to zero phase.

Figure 9:
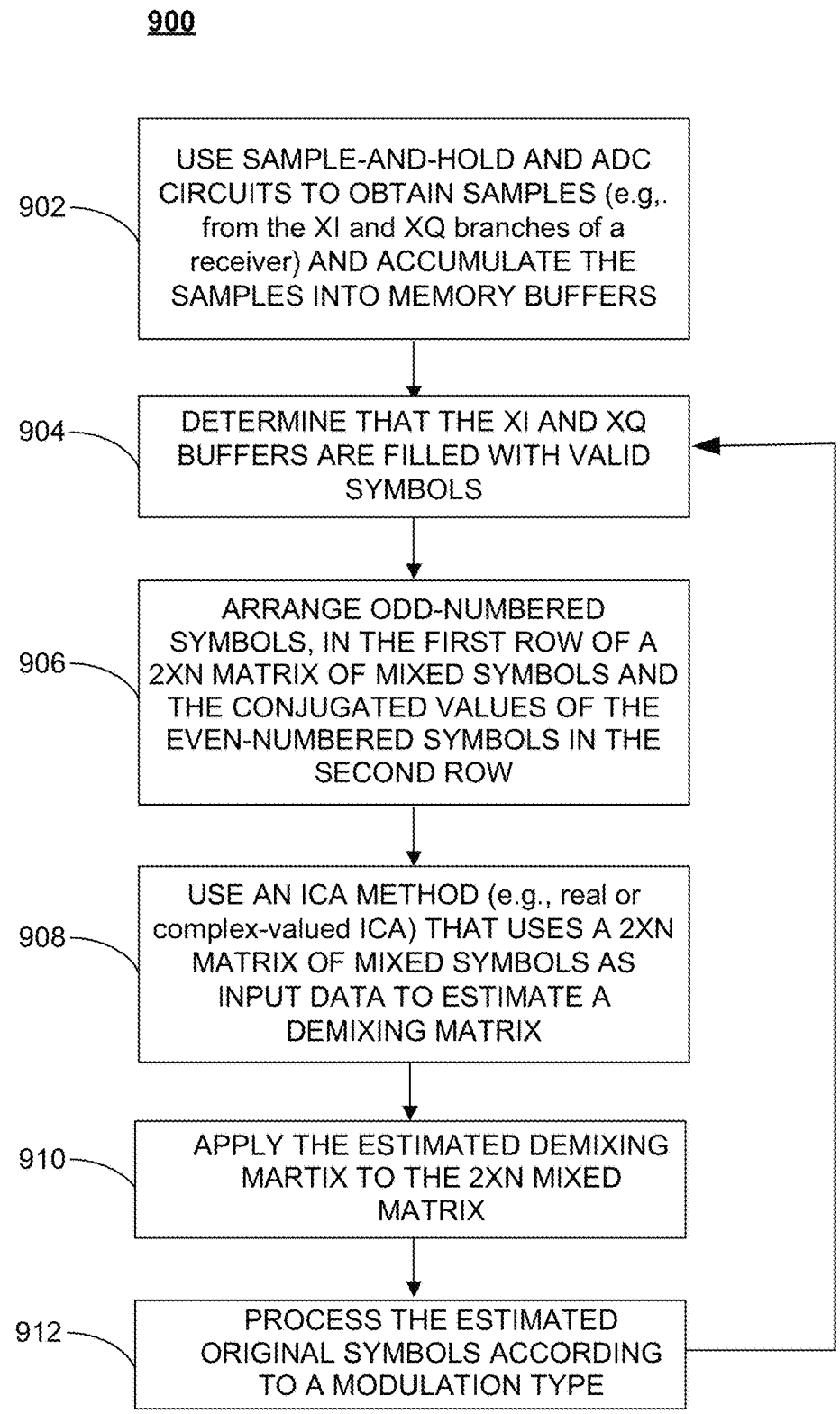
FIG. 9 is a flowchart of an illustrative process for channel estimation for STBC-encoded diversity transmitters, in accordance with various embodiments of the present disclosure.

FIG. 9 is a flowchart of an illustrative process for channel estimation for STBC-encoded diversity transmitters, in accordance with various embodiments of the present disclosure. In embodiments, process 900 aids in obtaining estimates of original symbols may be implemented, e.g., by a receiver having an architecture similar to that shown in FIG. 8. Process 900 in FIG. 9 may begin, at step 902, when using a set of sample-and-hold and ADC circuits in a receiver, obtain, e.g., at the Nyquist rate (one sample per symbol) a number of samples from the XI and XQ branches of a receiver and accumulate the samples into a set of memory buffers. One skilled in the art will appreciate that samples may be acquired concurrently.

At step 904, it may be determined that the XI and XQ buffers are filled with valid symbols, if so, process 900 may resume with step 906, when the odd-numbered symbols may be arranged in the first row of a 2×N matrix of mixed symbols and the conjugated values of the even-numbered symbols arranged in the second row.

At step 908, an ICA method that uses the 2×N matrix of mixed symbols as input data may be employed to estimate a demixing matrix, D. In embodiments, real or complex-valued ICA may be used according to preference, using any of the previously described methods.

At step 910, the estimated demixing matrix D may be applied to the 2×N mixed symbols matrix, e.g., by using matrix multiplication to form $$\begin{bmatrix} x_1 & x_3 & \overline{x_5} & x_{2N-1} \\ x_2 & x_4 & x_6 & x_{2N} \end{bmatrix} = D \begin{bmatrix} y_1 & y_3 & y_5 & y_{2N-1} \\ y_2^* & y_4^* & y_6^* & \cdots & y_{2N}^* \end{bmatrix}. \quad \text{(Eq. 11)}$$

At step 912, $\{x_1, x_2, x_3 \ldots x_{2N}\}$ may be taken as the estimated transmitted symbols and perform symbol slicing, forward error correction etc. according to the modulation type employed, at which point process 900 may resume with step 904.

One skilled in the art will appreciate that the performance of the disclosed embodiments for carrier recovery and/or polarization correction may depend on the particular ICA method used.

5. Simulation of 16-QAM Polarization Correction and Carrier Recovery

FIG. 10-FIG. 15 depict simulation results for various embodiments of the present disclosure. Implementations using two independent 16-QAM modulation streams that are sampled at 12 samples per symbol and utilize Bessel low-pass filtering to perform 5th-order Bessel pulse shaping have been simulated. Results indicate that a Baud rate of 50 Gbaud may yield 400 Gbps/λ.

Figure 10:
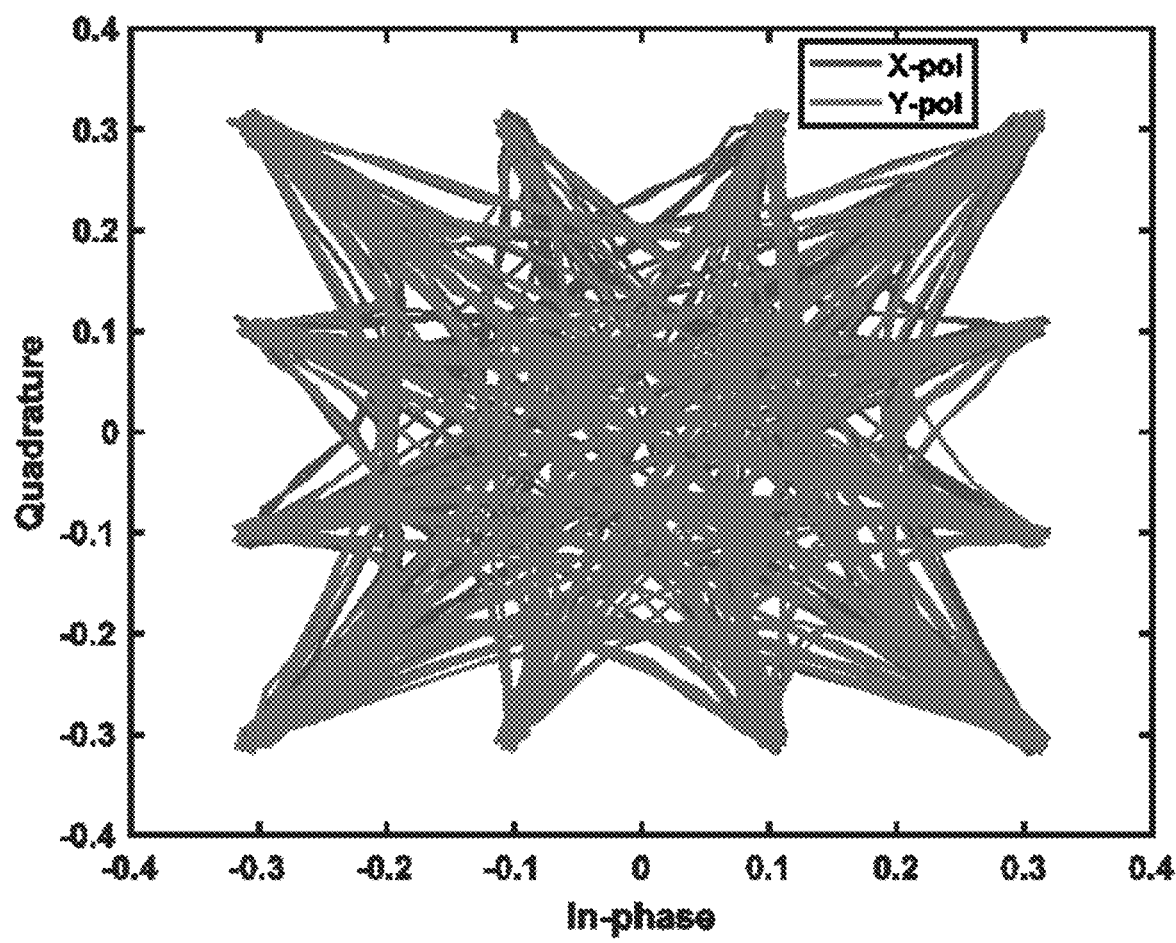
FIG. 10 depicts a 16-QAM transmitter modulation vector diagram (with added noise).

FIG. 10 depicts a 16-QAM transmitter modulation vector diagram (with added noise).

Figure 11:
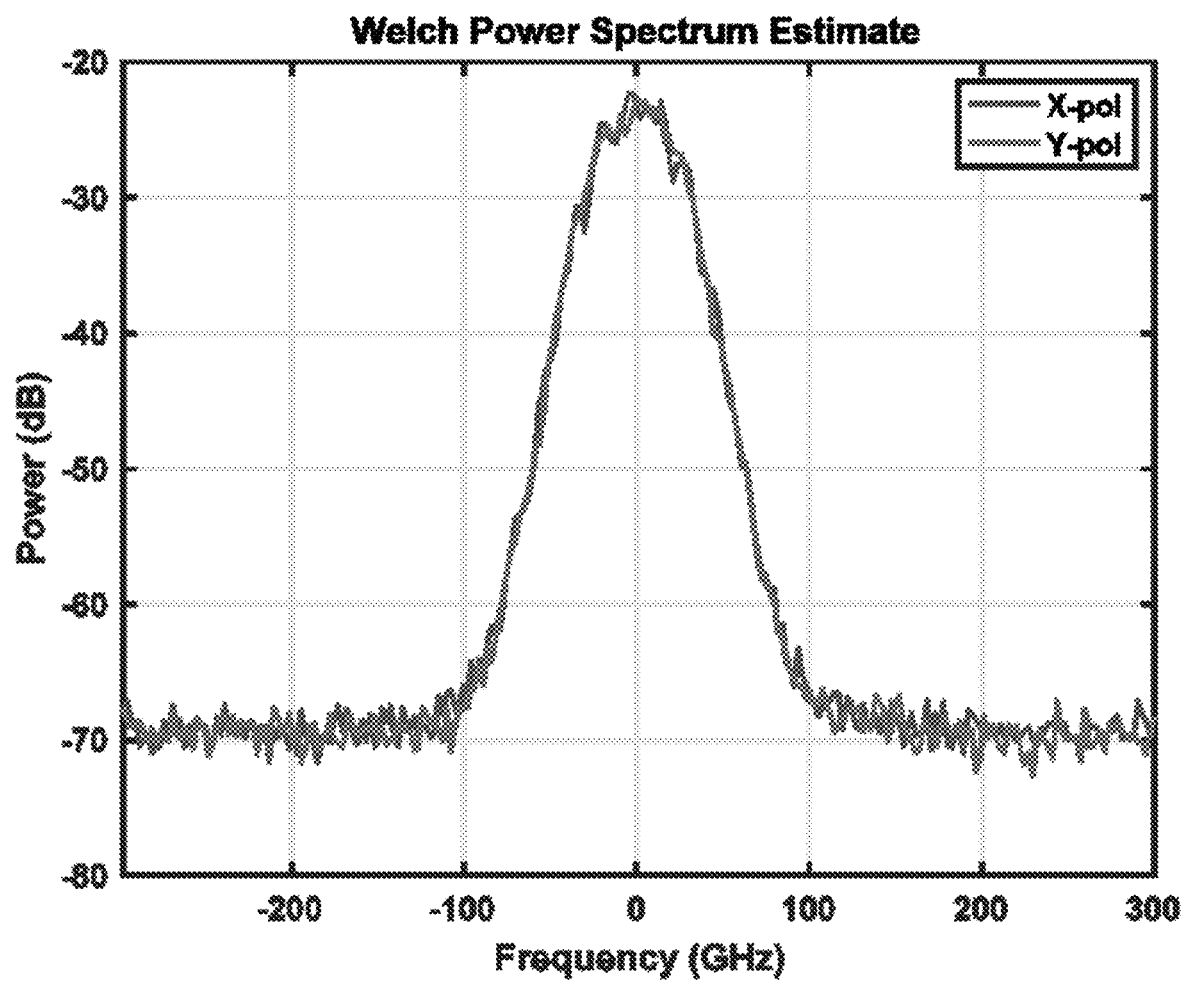
FIG. 11 depicts simulated DP-16-QAM power spectra.

FIG. 11 depicts simulated DP-16-QAM power spectra.

Figure 12:
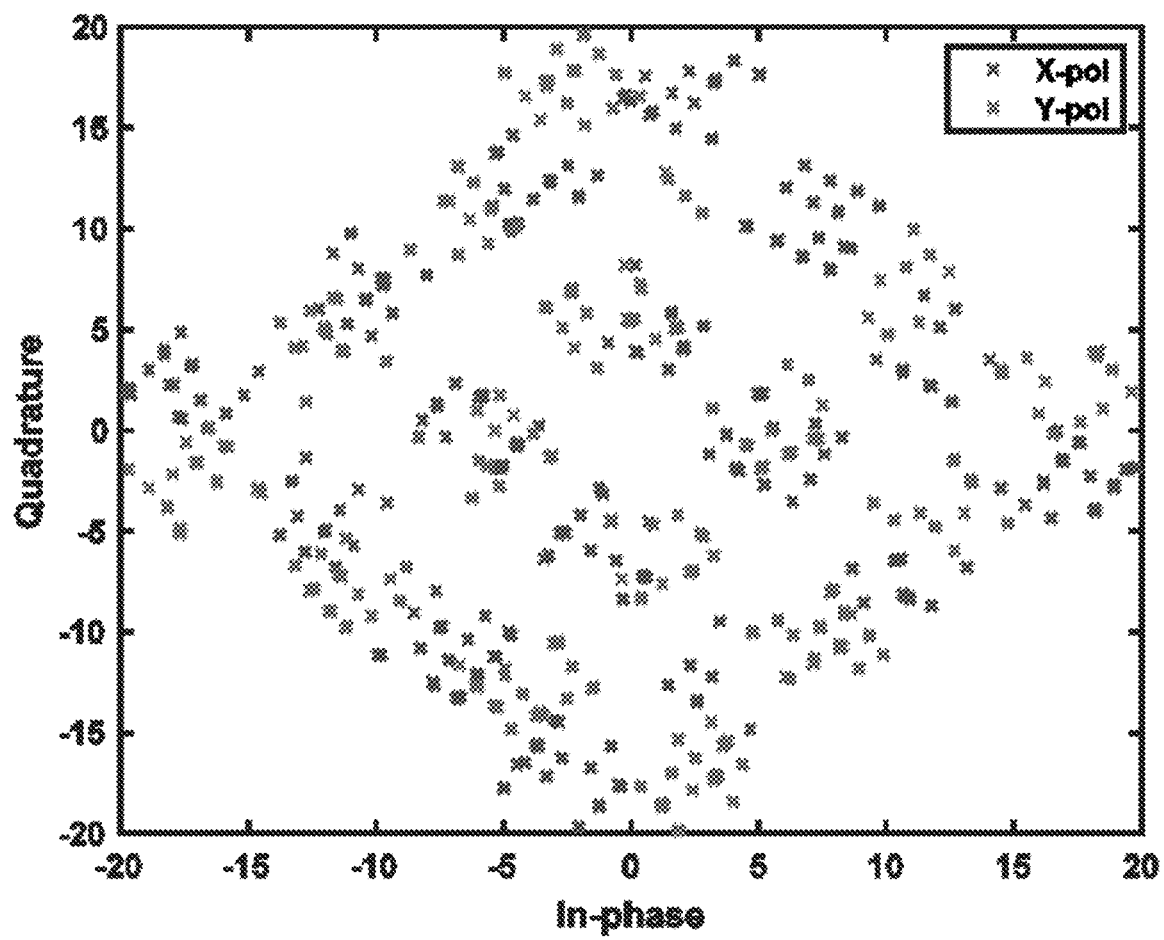
FIG. 12 depicts simulation results that show a scatter plot for a 16-QAM receiver that uses no polarization correction.

FIG. 12 depicts simulation results that show a scatter plot for a 16-QAM receiver that uses no polarization correction.

Figure 13:
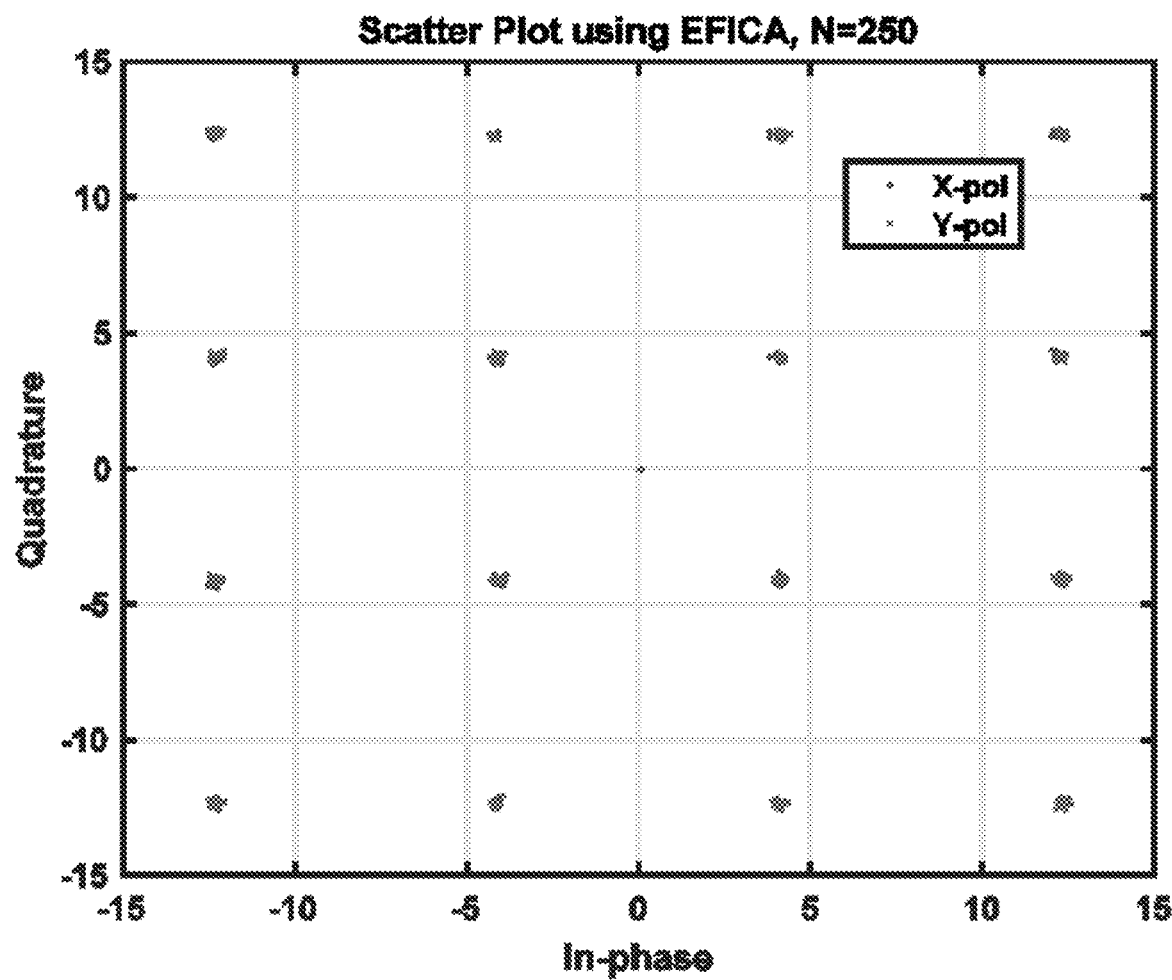
FIG. 13-FIG. 15 depict high-level simulation results illustrating scatter plots for a 16-QAM receiver that utilizes EFICA, FicaCMPLX, and JADE, respectively, according to various embodiments of the present disclosure.

FIG. 13 depicts simulation results illustrating a scatter plot for a 16-QAM receiver that utilizes EFICA according to various embodiments of the present disclosure.

Figure 14:
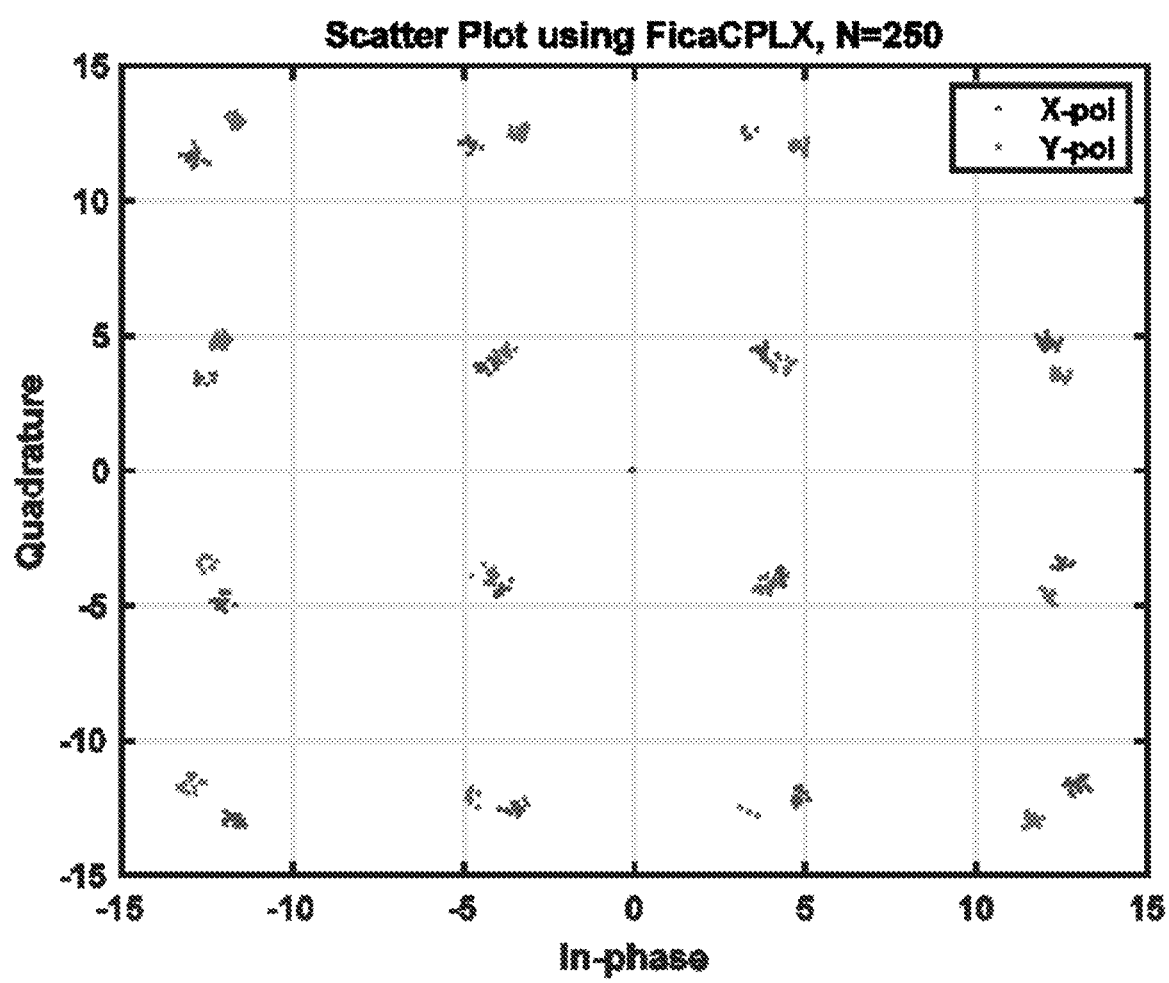

FIG. 14 depicts simulation results illustrating a scatter plot for a 16-QAM receiver that utilizes FicaCMPLX according to various embodiments of the present disclosure.

Figure 15:
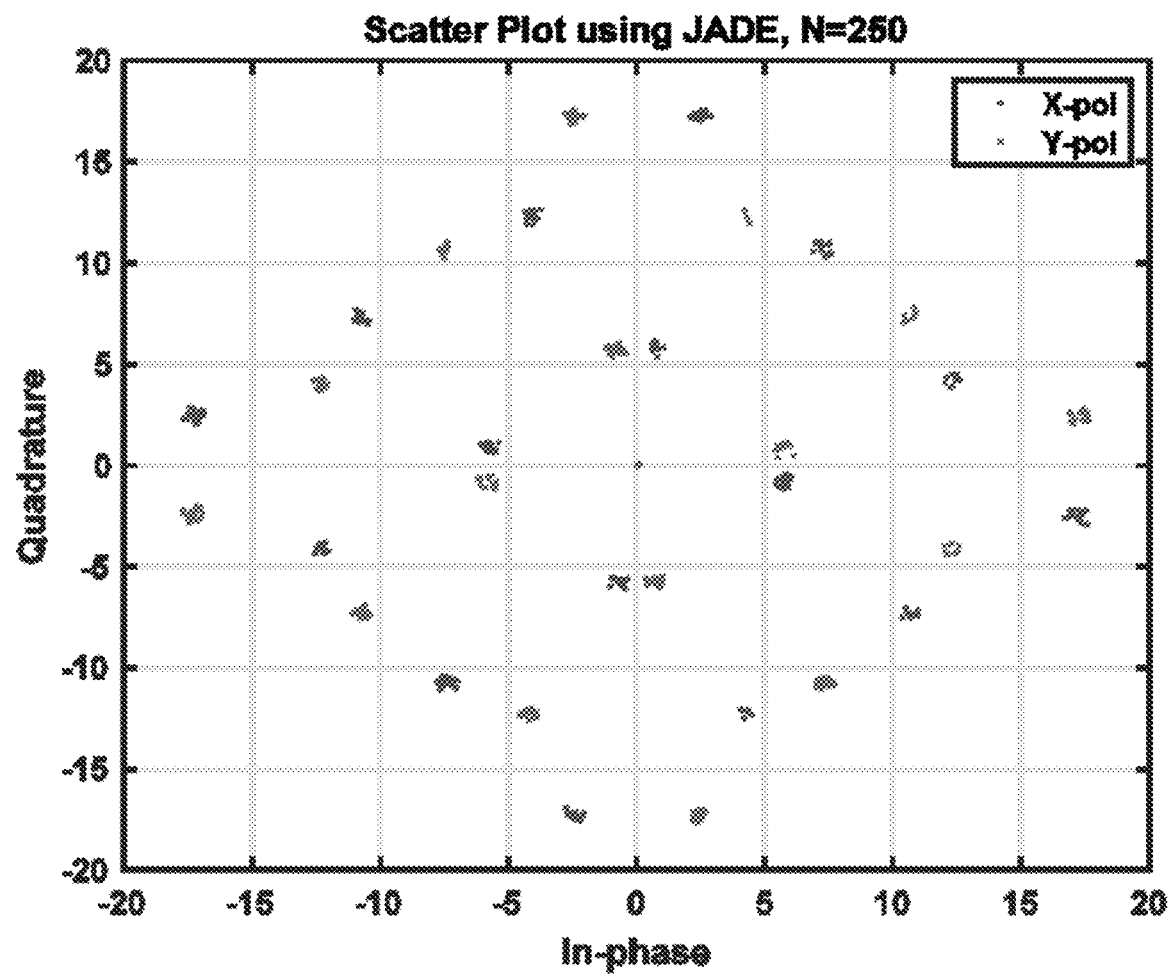

FIG. 15 depicts simulation results illustrating a scatter plot for a 16-QAM receiver that utilizes JADE according to various embodiments of the present disclosure.

All three methods, EFICA, FicaCMPLX, and JADE proved capable of resolving the polarization rotations. As the scatter plots in FIG. 13 and FIG. 14 illustrate, EFICA and FicaCMPLX correctly resolved the carrier phases, whereas JADE did not, as can be observed from the simulation results in FIG. 15. A comparison FIG. 13 and FIG. 14 illustrates that EFICA delivered superior results when compared to FicaCMPLX.

It is noted that the high-level simulation results presented herein are provided by way of illustration and were performed under specific conditions using specific embodiments. Accordingly, neither these simulations nor their results shall be used to limit the scope of the disclosure of the current patent document.

6. System Embodiments

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for analog polarization control using blind source separation (BSS), the method comprising:
   initializing a set of polarization control state variables;
   using a set of sample-and-hold and ADC circuits in a receiver to obtain a number of samples from XI, XQ, YI, and YQ branches of the receiver;
   accumulating the samples into a set of memory buffers;
   applying to the samples in the set of memory buffers complex independent component analysis (ICA) to perform BSS;
   factorizing a demixing matrix to obtain incremental angles;
   adding the incremental angles to the set of polarization control state variables to obtain updated polarization control state variables; and
   using the updated polarization control state variables to perform polarization control.

2. The method according to claim 1, further comprising adjusting a demixing matrix to become unitary.

3. The method according to claim 1, wherein obtaining updated polarization state variables comprises obtaining updated carrier phase state variables.

4. The method according to claim 1, further comprising:
   in response to receiving a first set of output signals having a first phase and a second set of output signals having a second phase, rotating, by a first phase angle, the first phase of one or more signals in the first set of output signals relative to the second phase of one or more signals in the second set of output signals to generate a set of rotated signals; and
   rotating the set of rotated signals by a second phase angle to align the set of rotated signals with a polarization frame of reference.

5. The method according to claim 4, wherein rotating the set of rotated signals reduces at least a component of the second set of output signals from the first set of output signals.

6. The method according to claim 4, wherein rotating the first phase comprises adjusting a gain that is defined by a set of trigonometric weights that correspond to the first and second phase angles.

7. The method according to claim 6, further comprising adjusting a polarity of the gain by adjusting relative transconductances of parallel differential amplifiers that are coupled in opposite polarities.

8. The method according to claim 6, further comprising adjusting gains of one or more amplifiers or attenuators in a plurality of signal paths representing a complex number representation of amplitude and phase of each polarization component.

9. A blind source separation (BSS)-based analog polarization and carrier phase control system, the control system comprising:
   a polarization controller in a receiver;
   ADC circuits coupled to the polarization controller;
   sample-and-hold circuits coupled to the ADC circuits, the sample-and-hold and ADC circuits concurrently acquire a number of samples from XI, XQ, YI, and YQ branches of the receiver;
   a set of memory buffers coupled to the sample-and-hold circuits to accumulate samples, the polarization controller performing steps comprising:
   initializing a set of polarization control state variables and a set of carrier phase state variables;
   applying to the samples in the set of memory buffers complex independent component analysis (ICA) to perform BSS;
   factorizing a demixing matrix obtain incremental angles;
   adding the incremental angles to the set of polarization control state variables to obtain updated polarization control state variables; and
   using the updated polarization control state variables to perform polarization control.

10. The control system according to claim 9, further comprising adjusting a demixing matrix to become unitary.

11. The control system according to claim 10, further comprising an analog polarization control circuit that uses amplifiers having variable gain that uses trigonometric weights.

12. The control system according to claim 11, wherein the analog polarization control circuit, in response to receiving a first set of polarization signals having a first phase and a second set of polarization signal having a second phase:
   rotates, by a first phase angle, the first phase of one or more signals in the first set of polarization signals relative to the second phase of one or more signals in the second set of polarization signals to generate a set of rotated signals; and
   rotates the set of rotated signals by a second phase angle to align the set of rotated signals with a polarization frame of reference.

13. The control system according to claim 12, wherein the analog polarization control circuit rotates the set of rotated signals by the second phase angle to align the set of rotated signals with a polarization frame of reference.

14. The control system according to claim 12, wherein the set of rotated signals compensates for a polarization rotation of at least one component of the first set of polarization signals relative to the second set of polarization signals.

15. A method for coherent combining of two receiver branches with initially unknown relative phase, the method comprising:
   vertically concatenating four row vectors representing XI, XQ, YI, and YQ receiver branch signals to form a 4×N matrix;
   performing a real-valued blind source separation (BSS) to obtain a 4×4 demixing matrix;
   reversing row permutations that separate complex variables into non-adjacent rows;
   obtaining an estimate of a 2×2 complex demixing matrix; and
   using the estimate to determine polarization states in a polarization recovery loop.

16. The method according to claim 15, further comprising adjusting a demixing matrix to become unitary.

17. The method according to claim 15, wherein the estimate of the 2×2 complex demixing matrix is obtained by using an averaging method.

18. The method according to claim 15, wherein performing the real-valued BSS comprises:
   initializing a set of polarization control state variables;

using a set of sample-and-hold and ADC circuits in a receiver to obtain a number of samples from XI, XQ, YI, and YQ branches of the receiver;

accumulating the samples into a set of memory buffers;

applying to the samples in the set of memory buffers complex independent component analysis (ICA) to perform BSS;

factorizing a demixing matrix to obtain incremental angles;

adding the incremental angles to the set of polarization control state variables to obtain updated polarization control state variables; and using the updated polarization control state variables to perform polarization control.

19. The method according to claim 18, wherein obtaining updated polarization state variables comprises obtaining updated carrier phase state variables.

20. The method according to claim 18, further comprising:

in response to receiving a first set of output signals having a first phase and a second set of output signals having a second phase, rotating, by a first phase angle, the first phase of one or more signals in the first set of output signals relative to the second phase of one or more signals in the second set of output signals to generate a set of rotated signals; and rotating the set of rotated signals by a second phase angle to align the set of rotated signals with a polarization frame of reference.

\* \* \* \* \*